US010263668B2

United States Patent
Li et al.

(10) Patent No.: US 10,263,668 B2
(45) Date of Patent: Apr. 16, 2019

(54) DUAL-BAND WIRELESS HEADPHONES

(71) Applicant: Bestechnic (Shanghai) Co., Ltd., Shanghai (CN)

(72) Inventors: Hua Li, Shanghai (CN); Weifeng Tong, Shanghai (CN); Liang Zhang, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/936,397

(22) Filed: Mar. 26, 2018

(65) Prior Publication Data

US 2018/0331724 A1 Nov. 15, 2018

(30) Foreign Application Priority Data

May 11, 2017 (CN) .......................... 2017 1 0329107

(51) Int. Cl.
*H04B 5/00* (2006.01)
*H04R 1/10* (2006.01)

(52) U.S. Cl.
CPC ......... *H04B 5/0006* (2013.01); *H04R 1/1091* (2013.01); *H04R 2420/07* (2013.01); *Y02D 70/10* (2018.01); *Y02D 70/14* (2018.01); *Y02D 70/42* (2018.01)

(58) Field of Classification Search
CPC ............................. H04M 1/6066; H04B 1/385
USPC .................................... 455/41.1–41.3, 575.2
See application file for complete search history.

(56) References Cited

U.S. PATENT DOCUMENTS

| | | | |
|---|---|---|---|
| 2006/0073787 A1* | 4/2006 | Lair .................... | H04M 1/6066 455/41.1 |
| 2007/0147630 A1* | 6/2007 | Chiloyan ............ | H04M 1/6066 381/74 |
| 2007/0149261 A1* | 6/2007 | Huddart ................ | H04R 5/033 455/575.2 |
| 2008/0076489 A1* | 3/2008 | Rosener .............. | H04M 1/6066 455/575.2 |
| 2008/0226094 A1* | 9/2008 | Rutschman ......... | H04M 1/6066 381/79 |
| 2008/0318518 A1* | 12/2008 | Coutinho ............... | H04H 20/62 455/3.06 |

(Continued)

*Primary Examiner* — Simon Nguyen
(74) *Attorney, Agent, or Firm* — Bayes PLLC

(57) ABSTRACT

Embodiments of wireless audio systems, wireless transceivers, and methods for wirelessly communicating audio information are disclosed herein. In one example, a wireless audio system includes a primary wireless transceiver and a secondary wireless transceiver. The primary wireless transceiver includes a first radio frequency (RF) module configured to receive, from an audio source, first audio information at a first frequency. The primary wireless transceiver further includes a second RF module configured to transmit second audio information at a second frequency lower than the first frequency. The second audio information is generated based on the first audio information. The secondary wireless transceiver includes a third RF module configured to receive, from the second RF module, the second audio information at the second frequency. The first RF module implements a first short-range wireless communication protocol. Each of the second and third RF modules implements a second short-range wireless communication protocol amended from the first short-range wireless communication protocol.

20 Claims, 6 Drawing Sheets

(56) References Cited

U.S. PATENT DOCUMENTS

| | | | |
|---|---|---|---|
| 2009/0023417 A1* | 1/2009 | Davis | H04M 1/6066 455/403 |
| 2012/0231732 A1* | 9/2012 | Kerselaers | H04B 5/0006 455/41.1 |
| 2013/0227152 A1* | 8/2013 | Lee | H04W 48/16 709/227 |
| 2017/0272561 A1* | 9/2017 | Kim | H04M 1/6066 |
| 2018/0014106 A1* | 1/2018 | Jensen | H04R 1/1041 |

* cited by examiner

DUAL-BAND WIRELESS HEADPHONES

CROSS-REFERENCE TO RELATED APPLICATIONS

This application claims the benefit of priority to Chinese Patent Application No. 201710329107.4 filed on May 11, 2017, which is incorporated herein by reference in its entirety.

BACKGROUND

Embodiments of the present disclosure relate to wireless audio systems.

Loudspeakers, including headphones, have been widely used in daily life. Headphones are a pair of small loudspeaker drivers worn on or around the head over a user's ears, which convert an electrical signal to a corresponding sound.

Wired headphones, however, constrain the users' movement because of the wires (cords), and are particularly inconvenient during exercise. Conventional wireless headphones no longer need the wires between the headphones and the audio sources, but still require the wires between the left and right headphones.

SUMMARY

Embodiments of wireless audio systems, wireless transceivers, and methods for wirelessly communicating audio information are disclosed herein.

In one example, a wireless audio system includes a primary wireless transceiver and a secondary wireless transceiver. The primary wireless transceiver includes a first radio frequency (RF) module configured to receive, from an audio source, first audio information at a first frequency. The primary wireless transceiver further includes a second RF module operatively coupled to the first RF module and configured to transmit second audio information at a second frequency lower than the first frequency. The second audio information is generated based on the first audio information. The secondary wireless transceiver includes a third RF module configured to receive, from the second RF module of the primary wireless transceiver, the second audio information at the second frequency. The first RF module implements a first short-range wireless communication protocol. Each of the second and third RF modules implements a second short-range wireless communication protocol amended from the first short-range wireless communication protocol.

In another example, a wireless transceiver includes a first RF module and a second RF module. The first RF module is configured to receive first audio information from an audio source at a first frequency and generate second audio information based on the first audio information. The second RF module is operatively coupled to the first RF module and configured to transmit, to another wireless transceiver, the second audio information at a second frequency lower than the first frequency. The first RF module implements a first short-range wireless communication protocol. The second RF module implements a second short-range wireless communication protocol amended from the first short-range wireless communication protocol.

In a different example, a method for wirelessly communicating audio information is disclosed. First audio information is received from an audio source at a first frequency using a first short-range wireless communication protocol. At least part of the first audio information is presented. Second audio information is generated based on the first audio information. The second audio information is transmitted to a wireless transceiver at a second frequency lower than the first frequency using a second short-range wireless communication protocol amended from the first short-range wireless communication protocol.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
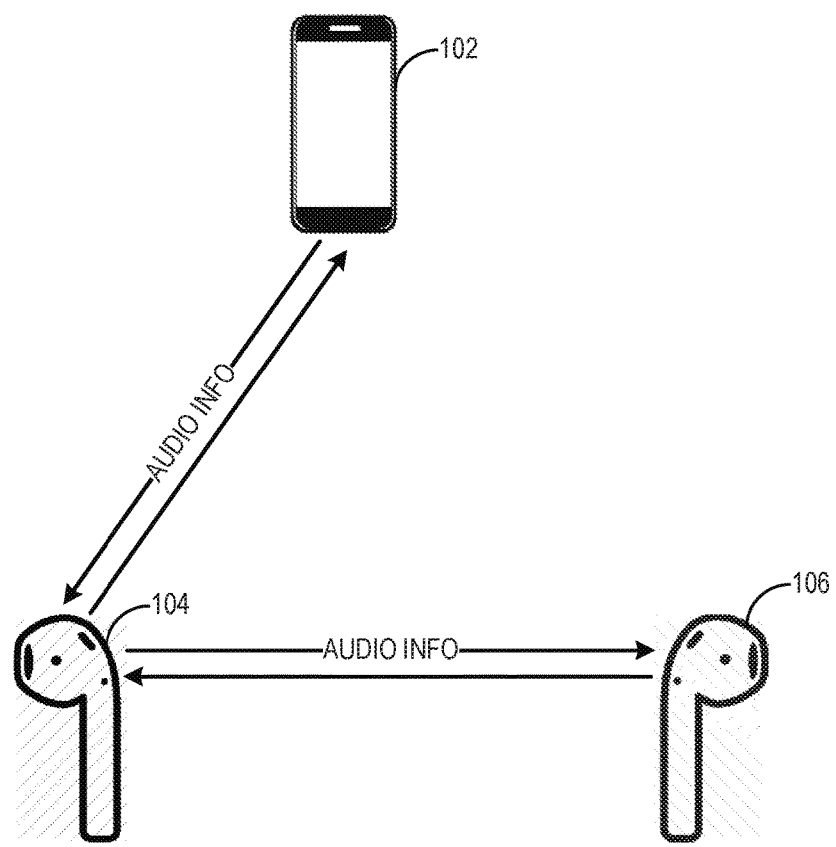
FIG. 1 is a block diagram illustrating an exemplary wireless audio system in accordance with an embodiment.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

True wireless stereo (TWS) headphones (also known as untethered headphones) is a type of wireless headphones that remove the wires between the left and right headphones. In some TWS headphones, a primary headphone can simultaneously communicate with an audio source and a secondary headphone. The audio source can transmit the left-channel audio information and the right-channel audio information to the primary headphone. In response, the primary headphone may keep one of the two channels of audio information and transmit the other channel of audio information to the secondary headphone, such that both the left-channel and right-channel audio information can be simultaneously played by the respective headphone using a synchronization mechanism. High latency is one of the technical challenges for TWS headphones, which is mainly caused by data retransmission. For example, although the Bluetooth protocol has certain error correction functions, those functions may not work well when the signal quality in the air is poor. The poor signal quality requires repeated data retransmission until the correct data packets are received in order to avoid lagging.

For Bluetooth TWS headphones, the communication between the primary and secondary headphones is usually carried out by the carrier wave at 2.4 GHz, which is the RF band for both Bluetooth and WiFi signals. Also, the physical structures of the human head between the left and right ears can cause significant attenuation of the 2.4 GHz wireless signal, thereby affecting the signal quality between the primary and secondary headphones, such as causing lagging and/or high latency.

As will be disclosed in detail below, among other novel features, the wireless audio systems disclosed herein can achieve "true wireless stereo" with improved signal quality and reduced power consumption. In some embodiments of the present disclosure, the communication between the primary and secondary headphones is not carried out in the working band of Bluetooth (i.e., 2.4 GHz), but instead in a different band that is lower than the Bluetooth working band. For example, the primary and secondary headphones may communicate with one another using near-field magnetic induction (NFMI) communication (e.g., at about 10 MHz). NFMI signals can effectively pass through the physical structures of the human head, reduce signal interference, maintain high bit rate transmission, ensure audio play quality, and reduce power consumption.

In some embodiments of the present disclosure, the NFMI communication between the primary and secondary headphones is carried out based on a short-range wireless communication protocol that is amended from the short-range wireless communication protocol (e.g., the Bluetooth protocol) used by the communication between the primary headphone and the audio source. For example, each of the primary and secondary headphones may implement substantially the same Bluetooth protocol (except the differences related to the different carrier wave frequencies) and dynamically switch between high and low RF modules (e.g., operating at 2.4 GHz and 10 MHz carrier wave frequency, respectively) for short-range wireless communication. The headphones are thus compatible with the existing audio sources, such as smart phones and music players.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 is a block diagram illustrating an exemplary wireless audio system 100 in accordance with an embodiment. Wireless audio system 100 may include an audio source 102, a primary headphone 104, and a secondary headphone 106. Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. Primary headphone 104 and secondary headphone 106 may be a pair of loudspeakers that can be worn on or around the head over a user's ears. Primary headphone 104 and secondary headphone 106 may be any electroacoustic transducers that convert an electrical signal (e.g., representing the audio information provided by audio source 102) to a corresponding sound. In some embodiments, each primary headphone 104 and secondary headphone 106 may be an earbud (also known as earpiece) that can plug into the user's ear canal. In some embodiments, primary headphone 104 and secondary headphone 106 may be TWS headphones, which are individual units that are not physically held by a band over the head and/or electrically connected by a cord. Primary headphone 104 and/or secondary headphone 106 may be combined with a microphone to form a headset according to some embodiments. It is understood that although in FIG. 1, wireless audio system 100 includes both audio source 102 and the pair of primary and secondary headphones 104 and 106, in some embodiments, wireless audio system 100 may include only primary headphone 104 and secondary headphone 106.

As shown in FIG. 1, bidirectional communications may be achieved between audio source 102 and primary headphone 104 and between primary headphone 104 and secondary headphone 106. Audio source 102 may transmit audio information (e.g., in data packets) by a carrier wave at a first frequency to primary headphone 104. In some embodiments, audio information may be a stream of audio stereo information in the form of compressed or uncompressed stereo samples for first and second audio channels, such as left-channel audio information and right-channel audio information or the like. Primary headphone 104 may transmit acknowledgement packets back to audio source 102 upon successful reception of the audio information from audio source 102.

In some embodiments, audio information may be transmitted from audio source 102 to primary headphone 104 according to the Bluetooth protocol at the working RF band between 2402 MHz and 2480 MHz or between 2400 MHz and 2483.5 MHz (referred to herein as "2.4 GHz"). Bluetooth is a wireless technology standard for exchanging data over short distances, and the Bluetooth protocol is one example of short-range wireless communication protocols. In some embodiments, audio information may be transmitted by audio source 102 to primary headphone 104 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocols. It is understood that the communication between audio source 102 and primary headphone 104 may be any other suitable short-range wireless communication in addition to Bluetooth and WiFi. In some embodiments, primary headphone 104 may be configured as a left-channel headphone or a right-channel headphone for playing the corresponding left-channel or right-channel audio information extracted from the audio information received from audio source 102.

Primary headphone 104 may transmit audio information (e.g., in data packets) by a carrier wave at a second frequency that is lower than the first frequency to secondary headphone 106. In some embodiments, the audio information transmitted from primary headphone 104 to secondary headphone 106 may be one of the left-channel or right-channel audio information depending on whether secondary headphone 106 is configured as a left-channel headphone or a right-channel headphone. Secondary headphone 106 may not communicate with audio source 102 directly, but instead, receive audio information forwarded by primary headphone 104. Secondary headphone 106 may transmit acknowledgement packets back to primary headphone 104 upon successful reception of the audio information from primary headphone 104.

In some embodiments, audio information may be transmitted by primary headphone 104 to secondary headphone 106 using NFMI communication. NFMI communication is a short-range wireless communication by coupling a tight, low-power, non-propagating magnetic field between devices. NFMI communication can contain transmission energy within the localized magnetic field, which does not radiate into free space. As the magnetic field can easily penetrate the physical structures of the human head, signal attenuation caused by the human head can be significantly reduced for the communication between primary headphone 104 and secondary headphone 106. In some embodiments, the second frequency (e.g., the carrier wave frequency for NFMI communication) is between about 5 MHz and about 50 MHz (e.g., between 5 MHz and 50 MHz), such as between 5 MHz and 40 MHz, between 5 MHz and 30 MHz, between 5 MHz and 20 MHz, between 5 MHz and 10 MHz, between 15 MHz and 50 MHz, between 25 MHz and 50 MHz, between 35 MHz and 50 MHz, and between 45 MHz and 50 MHz. In some embodiments, the carrier wave frequency is about 10 MHz (e.g., 10 MHz) or about 13.56 MHz (e.g., 13.56 MHz). As the second frequency may be significantly lower than the first frequency (e.g., 2.4 GHz for Bluetooth and WiFi), signal interference can be greatly reduced as well for the communication between primary headphone 104 and secondary headphone 106.

Primary headphone 104 may communicate with secondary headphone 106 using a carrier wave with a frequency (e.g., 10 MHz) lower than the working RF band of Bluetooth or WiFi (e.g., 2.4 GHz). Beside the differences related to the different carrier wave frequencies, the communication between primary headphone 104 and secondary headphone 106 may use a short-range wireless communication protocol that is substantially the same as the short-range wireless communication protocol used by the communication between audio source 102 and primary headphone 104, such as the Bluetooth protocol or WiFi protocol. That is, a short-range wireless communication protocol (e.g., the Bluetooth or WiFi protocol) may be amended to change the carrier wave frequency (and any specification related to the carrier wave frequency) to generate a substantially the same short-range wireless communication protocol (an amended short-range wireless communication protocol, e.g., an amended Bluetooth protocol or amended WiFi protocol) used by the communication between primary headphone 104 and secondary headphone 106. In some embodiments, primary headphone 104 can implement a first short-range wireless communication protocol for the communication with audio source 102 and a second short-range wireless communication protocol amended from the first short-range wireless communication protocol for the communication with secondary headphone 106, thereby saving resource and reducing system complexity. Building on substantially the same short-range wireless communication protocol, primary headphone 104 can use different carrier RF bands for the communication with audio source 102 and the communication with secondary headphone 106 to improve the signal quality of the communication with secondary headphone 106.

In some embodiments, primary headphone 104 and secondary headphone 106 may have the same hardware structures, but in different working modes. That is, the same headphone can work as either primary headphone 104 or secondary headphone 106 depending on its working mode, e.g., primary mode or secondary mode. In some embodiments, primary headphone 104 and secondary headphone 106 may switch their roles upon certain conditions as described below in detail. That is, primary headphone 104 may switch to the secondary mode to become a secondary headphone, while at the same time, secondary headphone 106 may switch to the primary node to become a primary headphone.

Figure 2:
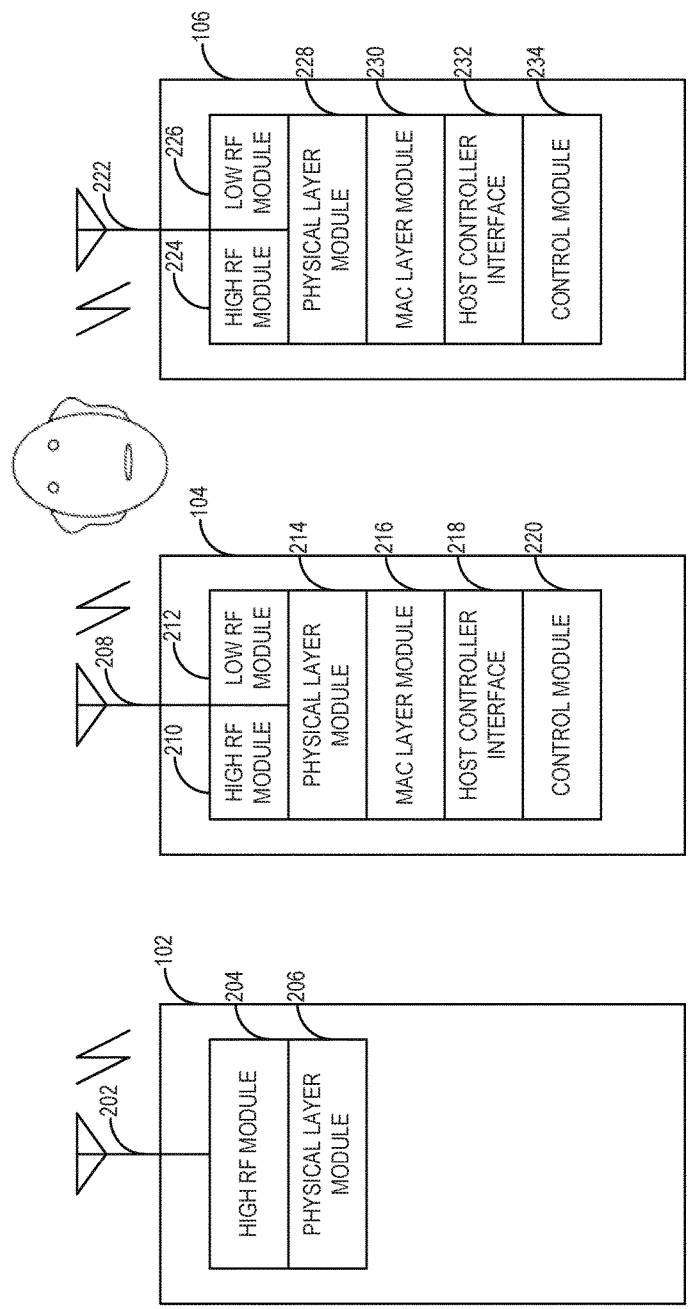
FIG. 2 is a detailed block diagram of the exemplary wireless audio system in FIG. 1 in accordance with an embodiment.

FIG. 2 is a detailed block diagram of exemplary wireless audio system 100 in FIG. 1 in accordance with an embodiment. Audio source 102 in this example includes an antenna 202, a high RF module 204, and a physical layer module 206. Antenna 202 may include an array of conductors for transmitting and receiving radio waves at one or more RF bands corresponding to high RF module 204. For example, antenna 202 may transmit audio information modulated by a carrier wave at a first frequency using high RF module 204. As described above, the audio information may be any music and/or voice information provided by audio source 102. For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels).

High RF module 204 and physical layer module 206 may be in the same integrated circuit (IC) chip that implements a short-range wireless communication protocol, such as the Bluetooth protocol or WiFi protocol. High RF module 204 may be configured to modulate the audio information using the carrier wave at the first frequency, for example, at 2.4 GHz for Bluetooth or WiFi communication, and transmit the audio information at the first frequency via antenna 202. Physical layer module 206 may be configured to generate the physical link (baseband) between audio source 102 and primary headphone 104 according to the short-range wireless communication protocol. For example, physical layer module 206 may generate baseband packets (e.g., Bluetooth packets) based on the music and/or voice data (payload) and perform error correction using any known methods, such as forward error correction (FEC) and automatic repeat request (ARQ). It is understood that additional module(s) may be included in audio source 102, either in the same IC chip in which high RF module 204 and physical layer module 206 are formed or in a separate IC chip, for transmitting the audio information at the first frequency based on the short-range wireless communication protocol.

Primary headphone 104 in this example may include a wireless transceiver (primary wireless transceiver) configured to receive the audio information transmitted by audio source 102 at the first frequency. Primary headphone 104 may include other components, such as an enclosure, speakers, and a microphone (not shown). Primary wireless transceiver may include an antenna 208, a high RF module 210, a low RF module 212, a physical layer module 214, a media access control (MAC) layer module 216, a host controller interface (HCI) 218, and a control module 220. Some or all of the modules mentioned above may be integrated in the same IC chip to reduce the chip size and/or power consumption. Primary headphone 104 may present at least part of the audio information received from audio source 102 to the user via one of the user's ear. For example, the speaker of primary headphone 104 may play music and/or voice based on the entire audio information or one audio channel of the audio information.

Antenna 208 may include an array of conductors for transmitting and receiving radio waves at two or more RF bands corresponding to high RF module 210 and low RF module 212. High RF module 210 may be configured to receive, from audio source 102, first audio information at the first frequency via antenna 208. Low RF module 212 may be configured to transmit, to secondary headphone 106, second audio information at the second frequency lower than the first frequency via antenna 208. As referred to herein, the first frequency used for the communication between audio source 102 and primary headphone 104 is a "high" RF, such as 2.4 GHz used for Bluetooth or WiFi communication; the second frequency used for communication between primary headphone 104 and secondary headphone 106 is a "low" RF, such as between 5 MHz and 50 MHz for NFMI communication. Both high RF module 210 and low RF module 212 may implement substantially the same short-range wireless communication protocol for short-range wireless communications at different RF bands. For example, high RF module 210 may implement a first short-range wireless communication protocol (e.g., the Bluetooth protocol or WiFi protocol), and low RF module 212 may implement a second short-range wireless communication protocol amended from the first short-range wireless communication protocol (e.g., the amended Bluetooth or amended WiFi protocol). The second short-range wireless communication protocol may be substantially the same as the first short-range wireless communication protocol except the carrier wave frequency (and any specification related to the carrier wave frequency).

In some embodiments, high RF module 210 may operate at about 2.4 GHz (e.g., 2.4 GHz). In some embodiments, low RF module 212 may operate between about 5 MHz (e.g., 5 MHz) and about 50 MHz (e.g., 50 MHz) for NFMI communication. For example, low RF module 212 may operate at about 10 MHz (e.g., 10 MHz). In some embodiments, low RF module 212 may implement the frequency-hopping spread spectrum (FHSS) technique, such that the second frequency (low RF) may include a plurality of frequencies based on FHSS. For example, low RF module 212 may implement the amended Bluetooth protocol and use the FHSS specification in the amended Bluetooth protocol. FHSS can further reduce signal interference.

The second audio information may be generated by high RF module 210 and/or low RF module 212 based on the first audio information. In some embodiments, the second audio information may be the same as the first audio information. For example, the first audio information provided by audio source 102 may be mono audio information, and the same mono audio information may be transmitted by primary headphone 104 to secondary headphone 106. In some embodiments, the second audio information may be part of the first audio information. For example, the first audio information provided by audio source 102 may include left-channel audio information and right-channel audio information representing two separate audio channels, and the second audio information may be one of the left-channel audio information and right-channel audio information extracted from the first audio information. That is, each of primary headphone 104 and secondary headphone 106 may play sound of a corresponding audio channel.

Physical layer module 214 may be configured to generate the physical links (baseband) between audio source 102 and primary headphone 104 and between primary headphone 104 and secondary headphone 106 according to the short-range wireless communication protocol and the amended short-range wireless communication protocol used by high RF module 210 and low RF module 212, respectively. For example, physical layer module 214 may generate baseband packets (e.g., Bluetooth packets) based on the music and/or voice data (payload) and perform error correction using any known methods, such as FEC and ARQ. MAC layer module 216 may be configured to generate the logical data channel links between audio source 102 and primary headphone 104 and between primary headphone 104 and secondary headphone 106 according to the short-range wireless communication protocol and the amended short-range wireless communication protocol used by high RF module 210 and low RF module 212, respectively. For example, MAC layer module 216 may generate link control channel, link manager channel, user asynchronous channel, user isochronous channel, and user synchronous channel based on the Bluetooth protocol (and the amended Bluetooth protocol). In some embodiments, MAC layer module 216 may further control the modes of operation during the connection state. HCI 218 may be configured to provide a common interface to physical layer module 214 and MAC layer module 216 and access to hardware status and control registers. For example, when implementing the Bluetooth protocol (and the amended Bluetooth protocol), HCI 218 may provide a uniform method of accessing the Bluetooth baseband capabilities.

In this example, primary headphone 104 is referred to as "primary" because its RF module works in dual bands: the high RF band and low RF band. That is, primary headphone 104 in FIG. 2 works in the primary mode in which high RF module 210 and low RF module 212 are both enabled, and low RF module 212 works in the transmitter mode for transmitting audio information at the second frequency (low RF, e.g., 10 MHz). In some embodiments, control module 220 may control primary headphone 104 to switch to the secondary mode to become a "secondary" headphone. For example, control module 220 may disable high RF module 210 and cause low RF module 212 to switch to the receiver mode for receiving audio information at the second frequency (low RF, e.g., 10 MHz). In some embodiments, control module 220 may determine whether to switch the working mode of primary headphone 104 based on one or more parameters associated with primary headphone 104, such as power and/or signal quality. In one example, control module 220 may determine whether the remaining power of primary headphone 104 is below a threshold and cause primary headphone 104 to switch to the secondary mode because disabling high RF module 210 can reduce power consumption. In another example, control module 220 may determine whether the signal quality (e.g., signal-to-noise ratio (SNR) or received signal strength indicator (RSSI)) is below a threshold and cause primary headphone 104 to switch to the secondary mode when the signal quality becomes unsatisfactory. It is understood that in some embodiments, the parameter(s) may be associated with both primary headphone 104 and secondary headphone 106. For example, control module 220 may use the relative power and/or signal quality of primary headphone 104 and secondary headphone 106 (e.g., the difference of remaining powers of primary and secondary headphones 104 and 106) to determine whether to switch primary headphone 104 into the secondary mode.

Secondary headphone 106 in this example may include a wireless transceiver (secondary wireless transceiver) configured to receive the audio information transmitted by primary headphone 104 at the second frequency (low RF, e.g., 10 MHz). Secondary headphone 106 may include other components, such as an enclosure, speakers, and a microphone (not shown). Secondary wireless transceiver may include an antenna 222, a high RF module 224, a low RF module 226, a physical layer module 228, a MAC layer module 230, an HCI 232, and a control module 234. Some or all of the modules mentioned above may be integrated in the same IC chip to reduce the chip size and/or power consumption. Secondary headphone 106 may present at least part of the audio information to the user via one of the user's ear. For example, the speaker of secondary headphone 106 may play music and/or voice based on the audio information or one audio channel of the audio information.

In this example, secondary headphone 106 has the same hardware structures as primary headphone 104. The functions of each module mentioned above in secondary headphone 106 are the same as the counterparts in primary headphone 104 and thus, will not be repeated. Different from primary headphone 104, secondary headphone 106 in this example works in the secondary mode so that control module 234 controls high RF module 224 to be disabled and cause low RF module 226 to work in the receiver mode for receiving the audio information transmitted from low RF module 212 of primary headphone 104 at the second frequency (low RF, e.g., 10 MHz). Secondary headphone 106 may not communicate with audio source 102 at the first frequency (high RF, e.g., 2.4 GHz) in the secondary mode.

As described above, similar to control module 220 of primary headphone 104, control module 234 of secondary headphone 106 may switch secondary headphone 106 into the primary mode to become a "primary" headphone. The switch may be determined based on one or more parameters, such as power and/or signal quality. In some embodiments, both control modules 220 and 234 may work together to switch the roles of primary headphone 104 and secondary headphone 106 to improve the overall performance of the pair of wireless headphones 104 and 106. For example, power consumption may be balanced between the pair of wireless headphones 104 and 106, and the overall sound quality may be improved as well. In some embodiments, upon switching the roles of primary headphone 104 and secondary headphone 106, control module 220 of primary headphone 104 may transmit connection information (e.g., the host address of audio source 102) to secondary headphone 106, such that secondary headphone 106 can establish links with audio source 102. In some embodiments, while switching to the primary mode, high RF module 224 of secondary headphone 106 (now working as a primary headphone) may be enabled by control module 234 and forge itself as high RF module 210 of primary headphone 104 from audio source 102's perspective, so that audio source 102 will not perceive the working mode switch of primary headphone 104 and secondary headphone 106. As a result, the transmission of the audio information by audio source 102 may not be affected by the working mode switch of primary headphone 104 and secondary headphone 106.

Figure 3:
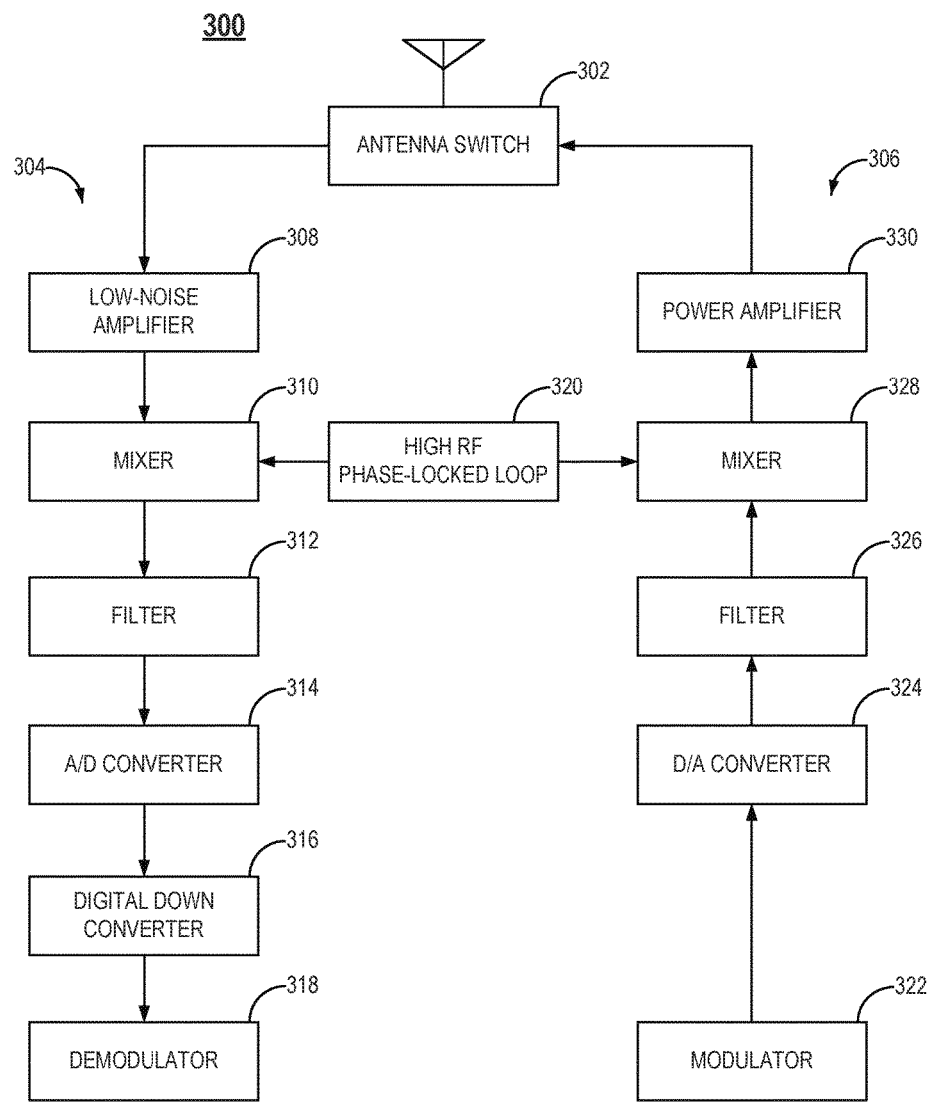
FIG. 3 is a block diagram illustrating an exemplary high RF module in accordance with an embodiment.

FIG. 3 is a block diagram illustrating an exemplary high RF module 300 in accordance with an embodiment. High RF module 300 may be an example of high RF module 210 and high RF module 224 (when it is enabled) shown in FIG. 2. In this example, high RF module 300 may include an antenna switch 302, a receiver signal link 304, and a transmitter signal link 306. Antenna switch 302 may be configured to switch the antenna to work with receiver signal link 304 or transmitter signal link 306. Receiver signal link 304 may include a low-noise amplifier 308, a mixer 310, a filter 312, an analog-to-digital (A/D) converter 314, a digital down converter 316, and a demodulator 318. Transmitter signal link 306 may include a modulator 322, a digital-to-analog (D/A) converter 324, a filter 326, a mixer 328, and a power amplifier 330.

In some embodiments, in receiver signal link 304, the received RF signal (e.g., the audio information modulated by the carrier wave from the audio source) may be amplified by low-noise amplifier 308 to suppress the noise signal and increase SNR. The frequency of the amplified RF signal may be adjusted by mixer 310 and filtered by filter 312. The analog RF signal may be converted to a digital signal by A/D converter 314, and the intermediate frequency (IF) of the digital signal may be reduced by digital down converter 316. The audio information in the digital signal may be demodulated by demodulator 318. For example, the audio information provided by an audio source may be modulated by a carrier wave at 2.4 GHz and received and recovered in the digital format by receiver signal link 304. The demodulated digital audio information may be further processed to separate the audio information in different audio channels, e.g., left-channel and right-channel audio information.

In some embodiments, in transmitter signal link 306, digital audio information may be modulated by a carrier wave at a frequency (e.g., 2.4 GHz) by modulator 322 and converted into an analog signal by D/A converted 324. The analog signal may pass through filter 326 and mixer 328 to adjust its frequency. In some embodiments, a high RF phase-locked loop (PLL) 320 may be provided between mixer 310 in receiver signal link 304 and mixer 328 in transmitter signal link 306. High RF PLL 320 may detect the phase offset of mixers 310 and 328 and adjust the frequency of the output signal of transmitter signal link 306. For example, high RF PLL 320 may work at 2.4 GHz. The output signal may be amplified by power amplifier 330 before it is transmitted by the antenna. In some embodiments (e.g., high RF module 210 in FIG. 2), because the high RF module of a primary headphone receives high RF signal from the audio source, but does not transmit the high RF signal (instead, it transmits a low RF signal by the low RF module), transmitter signal link 306 of high RF module 300 may be disabled in operation.

Figure 4:
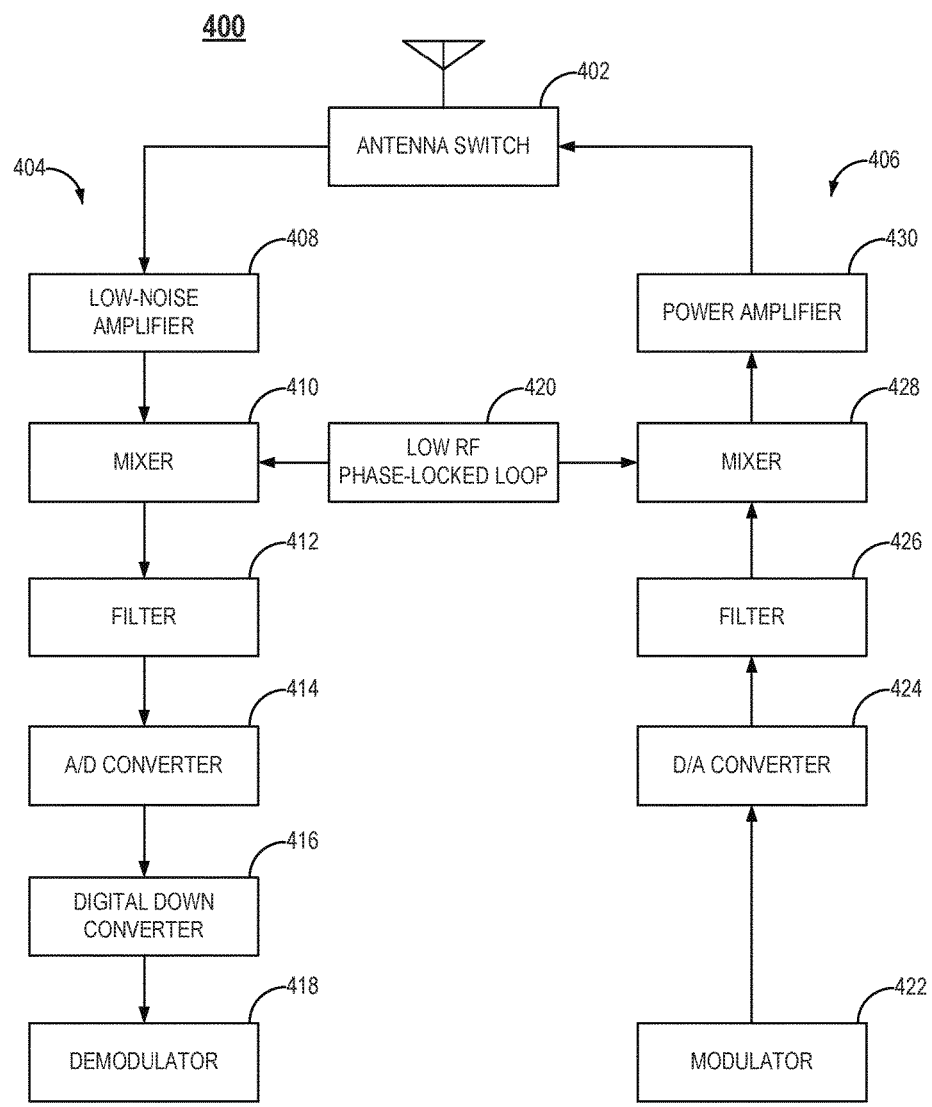
FIG. 4 is a block diagram illustrating an exemplary low RF module in accordance with an embodiment.

FIG. 4 is a block diagram illustrating an exemplary low RF module 400 in accordance with an embodiment. Low RF module 400 may be an example of low RF module 212 and low RF module 226 shown in FIG. 2. In this example, low RF module 400 may include an antenna switch 402, a receiver signal link 404, and a transmitter signal link 406. Antenna switch 402 may be configured to switch the antenna to work with receiver signal link 404 or transmitter signal link 406. Receiver signal link 404 may include a low-noise amplifier 408, a mixer 410, a filter 412, an A/D converter 414, a digital down converter 416, and a demodulator 418. Transmitter signal link 406 may include a modulator 422, a D/A converter 424, a filter 426, a mixer 428, and a power amplifier 430.

In some embodiments, in receiver signal link 404, the received RF signal (e.g., the audio information modulated by the carrier wave from the primary headphone) may be amplified by low-noise amplifier 408 to suppress the noise signal and increase SNR. The frequency of the amplified RF signal may be adjusted by mixer 410 and filtered by filter 412. The analog RF signal may be converted to a digital signal by A/D converter 414, and the IF of the digital signal may be reduced by digital down converter 416. The audio information in the digital signal may be demodulated by demodulator 418. For example, the audio information provided from the primary headphone may be modulated by a carrier wave at 10 MHz and received and recovered in the digital format by receiver signal link 404. The demodulated digital audio information may include audio information in one of multiple audio channels, e.g., left-channel or right-channel audio information.

In some embodiments, in transmitter signal link 406, digital audio information may be modulated by a carrier wave at a frequency (e.g., 10 MHz) by modulator 422 and converted into an analog signal by D/A converted 424. The analog signal may pass through filter 426 and mixer 428 to adjust its frequency. In some embodiments, a low RF PLL may be provided between mixer 410 in receiver signal link 404 and mixer 428 in transmitter signal link 406. Low RF PLL 420 may detect the phase offset of mixers 410 and 428 and adjust the frequency of the output signal of transmitter signal link 406. For example, low RF PLL 420 may work at 10 MHz. The output signal may be amplified by power amplifier 430 before it is transmitted by the antenna. In some embodiments (e.g., low RF module 212 of primary headphone 104 in FIG. 2), because the low RF module of a primary headphone transmits a low RF signal to a secondary headphone, but does not receive a low RF signal, receiver signal link 404 of low RF module 400 may be disabled in operation when it is used in the primary headphone. In some embodiments (e.g., low RF module 226 of secondary headphone 106 in FIG. 2), because the low RF module of a secondary headphone receives a low RF signal from a primary headphone, but does not transmit a low RF signal, transmitter signal link 406 of low RF module 400 may be disabled in operation when it is used in the secondary headphone.

Figure 5:
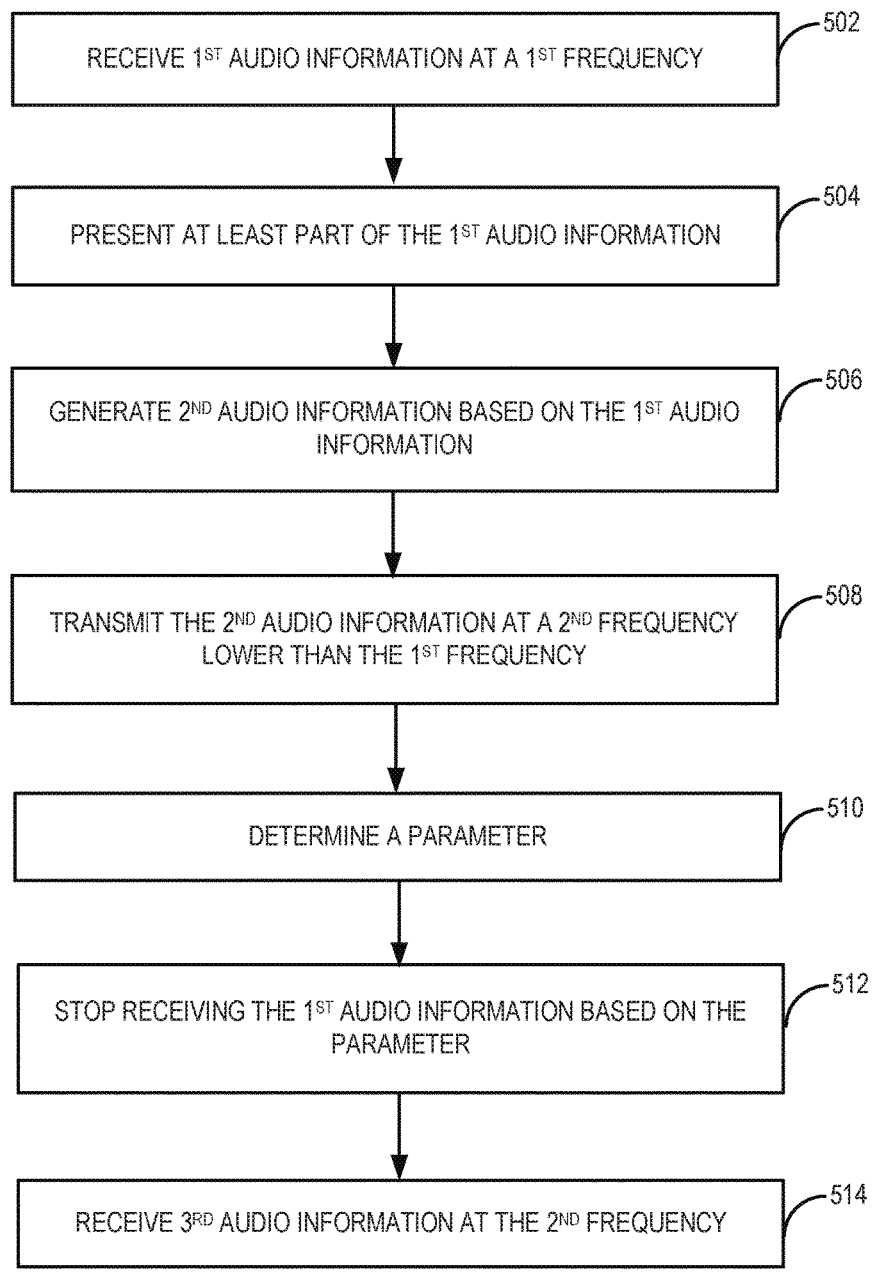
FIG. 5 is a flow chart illustrating an exemplary method for wirelessly communicating audio information in accordance with an embodiment.

FIG. 5 is a flow chart illustrating an exemplary method 500 for wirelessly communicating audio information in accordance with an embodiment. Method 500 can be performed by processing logic that can comprise hardware (e.g., circuitry, dedicated logic, programmable logic, micro- code, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 5, as will be understood by a person of ordinary skill in the art.

Method 500 shall be described with reference to FIGS. 1 and 2. However, method 500 is not limited to that exemplary embodiment. Starting at 502, first audio information is received at a first frequency using a first short-range wireless communication protocol, such as the Bluetooth protocol. The first frequency may be 2.4 GHz. In some embodiments, high RF module 210 of primary headphone 104 may receive a stream of mono or stereo audio information from high RF module 204 of audio source 102 at a high RF, such as 2.4 GHz, using the Bluetooth protocol.

At 504, at least part of the first audio information is presented. The entire audio information may be presented if it is in a single audio channel, or part of the audio information in one of multiple audio channels may be presented. In some embodiments, primary headphone 104 may convert at least part of the first audio information for primary headphone 104 (e.g., left-channel or right-channel audio information) into a sound signal and play the sound to the user.

At 506, second audio information is generated based on the first audio information. In one example, the second audio information may be the same as the first audio information, for example, when the first audio information represents mono audio. In another example, the first audio information may represent stereo audio, and the second information may be generated by extracting audio information of one of multiple audio channels from the first audio information. In some embodiments, high RF module 210 and/or low RF module 212 may generate the second audio information based on the first audio information provided by audio source 102.

At 508, the second audio information is transmitted at a second frequency lower than the first frequency using a second short-range wireless communication protocol amended from the first short-range wireless communication protocol, such as the amended Bluetooth protocol. The second frequency may be between 5 MHz and 50 MHz, such as 10 MHz. In some embodiments, low RF module 212 of primary headphone 104 may transmit the second audio information to low RF module 226 of secondary headphone 106 at a low RF, such as 10 MHz, using the amended Bluetooth protocol.

At 510, a parameter is determined. The parameter may include power and signal quality. In some embodiments, control module 220 of primary headphone 104 may determine the remaining power and/or signal quality of primary headphone 104 as an indicator of whether to switch the working mode of primary headphone 104.

At 512, receiving the first audio information is stopped based on the parameter. In some embodiments, control module 220 of primary headphone 104 may determine that primary headphone 104 needs to be switched into the secondary mode due to the low power and/or poor signal quality. As a result, control module 220 may cause high RF module 210 of primary headphone 104 to be disabled to stop receiving the first audio information from audio source 102.

At 514, third audio information is received at the second frequency using the second short-range wireless communication protocol, such as the amended Bluetooth protocol. The second frequency may be between 5 MHz and 50 MHz, such as 10 MHz. In some embodiments, as part of the secondary mode, control module 220 may cause low RF module 212 of primary headphone 104 to receive, from low RF module 226 of secondary headphone 106 (now working as a primary headphone), the third audio information at the low RF, such as 10 MHz, using the amended Bluetooth protocol. The third audio information may be generated by high RF module 224 and/or low RF module 226 of secondary headphone 106 (now working as a primary headphone) based on the first audio information transmitted by audio source 102.

Figure 6:
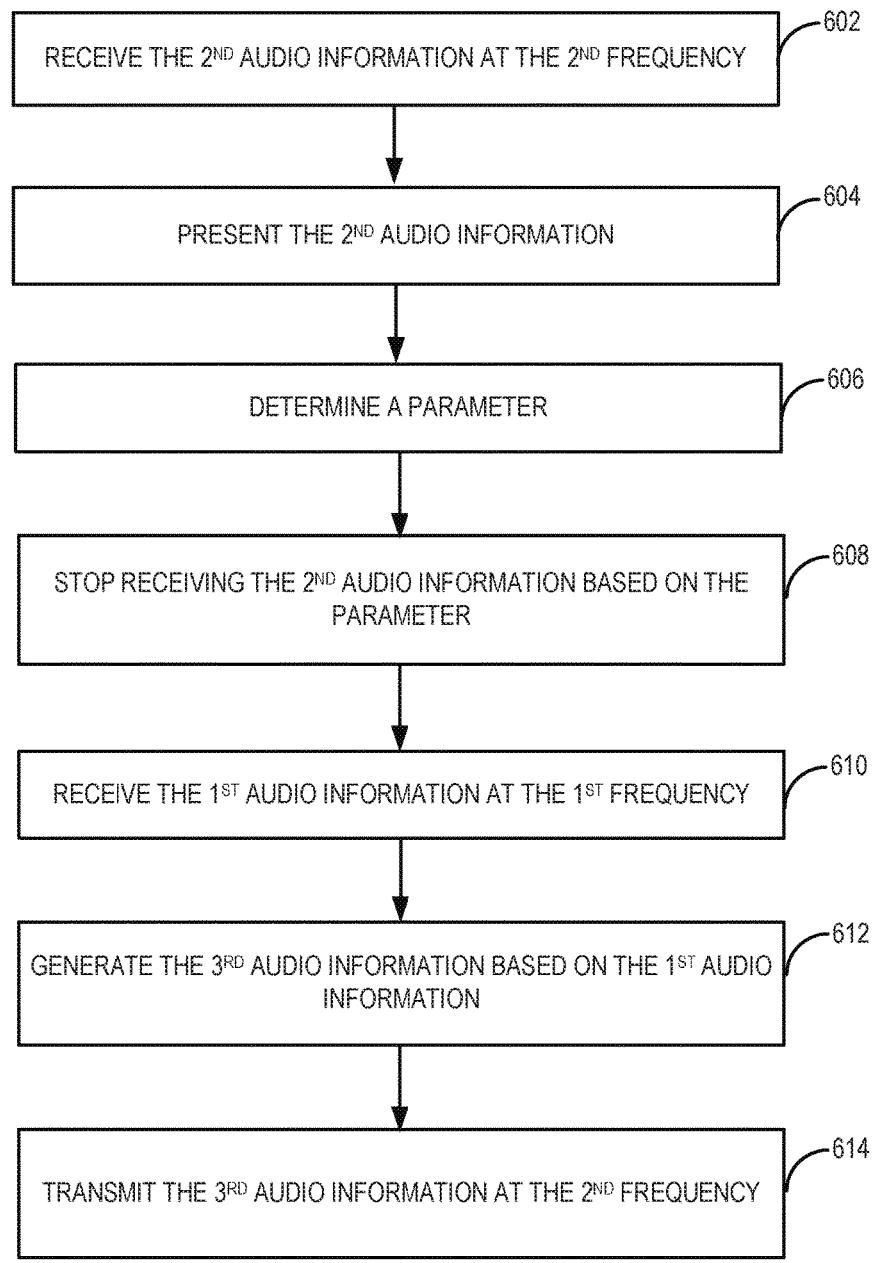
FIG. 6 is a flow chart illustrating another exemplary method for wirelessly communicating audio information in accordance with an embodiment.

FIG. 6 is a flow chart illustrating another exemplary method 600 for wirelessly communicating audio information in accordance with an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 6, as will be understood by a person of ordinary skill in the art.

Method 600 shall be described with reference to FIGS. 1 and 2. However, method 600 is not limited to that exemplary embodiment. Starting at 602, the second audio information is transmitted at the second frequency using the second short-range wireless communication protocol, such as the amended Bluetooth protocol. The second frequency may be between 5 MHz and 50 MHz, such as 10 MHz. In some embodiments, low RF module 226 of secondary headphone 106 may receive the second audio information from low RF module 212 of primary headphone 104 at the low RF, such as 10 MHz, using the amended Bluetooth protocol.

At 604, the second audio information is presented. The second audio information may represent the audio information in one of the multiple audio channels of stereo audio. In some embodiments, secondary headphone 106 may convert the second audio information into a sound signal and play the sound to the user.

At 606, a parameter is determined. The parameter may include power and signal quality. In some embodiments, control module 234 of secondary headphone 106 may determine the remaining power and/or signal quality of secondary headphone 106 as an indicator of whether to switch the working mode of secondary headphone 106.

At 608, receiving the second audio information is stopped based on the parameter. In some embodiments, control module 234 of secondary headphone 106 may determine that secondary headphone 106 needs to be switched to the primary mode due to the relatively high power and/or good signal quality compared with primary headphone 104. As a result, control module 234 may cause low RF module 226 of secondary headphone 106 to stop receiving the second audio information from low RF module 212 of primary headphone 104.

At 610, the first audio information is received at the first frequency using the first short-range wireless communication protocol, such as the Bluetooth protocol. The first frequency may be 2.4 GHz. In some embodiments, as part of the primary mode, control module 234 of secondary headphone 106 (now working as a primary headphone) may enable high RF module 224 of secondary headphone 106 to receive the stream of mono or stereo audio information from high RF module 204 of audio source 102 at the high RF, such as 2.4 GHz, using the Bluetooth protocol. In some embodiments, while working in the primary mode, high RF module 224 of secondary headphone 106 (now working as a primary headphone) may forge itself as high RF module 210 of primary headphone 104 from audio source 102's perspective, so that audio source 102 will not perceive the working mode switch of primary headphone 104 and secondary headphone 106. As a result, the transmission of the audio information by audio source 102 may not be affected by the working mode switch of primary headphone 104 and secondary headphone 106.

At 612, third audio information is generated based on the first audio information. In one example, the third audio information may be the same as the first audio information, for example, when the first audio information represents mono audio. In another example, the first audio information may represent stereo audio, and the third information may be generated by extracting audio information of one of multiple audio channels from the first audio information. In some embodiments, high RF module 224 and/or low RF module 226 may generate the third audio information based on the first audio information provided by audio source 102.

At 614, the third audio information is transmitted at the second frequency using the second short-range wireless communication protocol, such as the amended Bluetooth protocol. The second frequency may be between 5 MHz and 50 MHz, such as 10 MHz. In some embodiments, low RF module 226 of secondary headphone 106 (now working as a primary headphone) may transmit the third audio information to low RF module 212 of primary headphone 104 (now working as a secondary headphone) at the low RF, such as 10 MHz, using the amended Bluetooth protocol.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:
1. A wireless audio system, comprising:
a primary wireless transceiver comprising:

a first radio frequency (RF) module configured to receive, from an audio source, first audio information at a first frequency; and a second RF module operatively coupled to the first RF module and configured to transmit second audio information at a second frequency lower than the first frequency, the second audio information generated based on the first audio information; and a secondary wireless transceiver comprising:

a third RF module configured to receive, from the second RF module of the primary wireless transceiver, the second audio information at the second frequency; and a fourth RF module configured to (i) receive, from the audio source, the first audio information at the first frequency, and (ii) be disabled when the third RF module receives the second audio information from the second RF module of the primary wireless transceiver, wherein each of the first and fourth RF modules implements a first short-range wireless communication protocol, and each of the second and third RF modules implements a second short-range wireless communication protocol amended from the first short-range wireless communication protocol; and the primary wireless transceiver further comprises a physical layer module shared by the first RF module and the second RF module and configured to generate a first physical link between the audio source and the first RF module based on the first short-range wireless communication protocol and generate a second physical link between the second RF module and the third RF module based on the second short-range wireless communication protocol.

2. The wireless audio system of claim 1, wherein the second RF module of the primary wireless transceiver and the third RF module of the secondary wireless transceiver communicate with one another using near-field magnetic induction (NFMI) communication.

3. The wireless audio system of claim 1, wherein the second frequency is between about 5 MHz and about 50 MHz.

4. The wireless audio system of claim 3, wherein the second frequency is about 10 MHz.

5. The wireless audio system of claim 3, wherein the second frequency comprises a plurality of frequencies based on frequency-hopping spread spectrum (FHSS).

6. The wireless audio system of claim 1, wherein the first short-range wireless communication protocol comprises a Bluetooth protocol.

7. The wireless audio system of claim 1, wherein the first frequency is about 2.4 GHz.

8. The wireless audio system of claim 1, wherein the first RF module of the primary wireless transceiver is further configured to generate the second audio information based on the first audio information.

9. The wireless audio system of claim 8, wherein:
the first audio information comprises left-channel audio information and right-channel audio information; and
the second audio information comprises one of the left-channel audio information and the right-channel audio information.

10. The wireless audio system of claim 8, wherein the second audio information is the same as the first audio information.

11. The wireless audio system of claim 1, wherein each of the primary and secondary wireless transceivers is part of a respective wireless headphone.

12. The wireless audio system of claim 1, wherein the primary wireless transceiver further comprises a MAC layer module shared by the first RF module and the second RF module and configured to generate a first logic data channel link between the audio source and the first RF module based on the first short-range wireless communication protocol and generate a second logic data channel link between the second RF module and the third RF module based on the second short-range wireless communication protocol.

13. A wireless transceiver, comprising:
a first radio frequency (RF) module configured to receive first audio information from an audio source at a first frequency for BLUETOOTH communication using BLUETOOTH protocol and generate second audio information based on the first audio information;
a second RF module operatively coupled to the first RF module and configured to transmit, to another wireless transceiver, the second audio information at a second frequency lower than the first frequency for near-field magnetic induction (NFMI) communication using amended BLUETOOTH protocol; and
a physical layer module shared by the first RF module and the second RF module and configured to generate a first physical link between the audio source and the first RF module based on the BLUETOOTH protocol and generate a second physical link between the second RF module and the another wireless transceiver based on the amended BLUETOOTH protocol.

14. The wireless transceiver of claim 13, further comprising a control module configured to:
determine a parameter of the wireless transceiver;
cause the first RF module to be disabled based on the parameter; and
cause the second RF module to receive, from the another wireless transceiver, third audio information at the second frequency, wherein the third audio information is generated based on the first audio information.

15. The wireless transceiver of claim 14, wherein the parameter comprises at least one of power and signal quality.

16. The wireless transceiver of claim 13, further comprising a MAC layer module shared by the first RF module and the second RF module and configured to generate a first logic data channel link between the audio source and the first RF module based on the BLUETOOTH protocol and generate a second logic data channel link between the second RF module and the another wireless transceiver based on the amended BLUETOOTH protocol.

17. A method for wirelessly communicating audio information, comprising:
generating, by a physical layer module, a first physical link between an audio source and a first RF module based on BLUETOOTH protocol;
receiving, from the audio source via the first physical link, first audio information at a first frequency for BLUETOOTH communication using the BLUETOOTH protocol;
presenting at least part of the first audio information;
generating second audio information based on the first audio information;
generating, by the physical layer module, a second physical link between a second RF module and a wireless transceiver based on amended BLUETOOTH protocol, wherein the physical layer module is shared by the first RF module and the second RF module; and transmit, to the wireless transceiver via the second physical link, the second audio information at a second frequency lower than the first frequency for near-field magnetic induction (NFMI) communication using the amended BLUETOOTH.

18. The method of claim 17, further comprising:

determining a parameter;

stopping receiving, from the audio source, the first audio information based on the parameter; and receiving, from the wireless transceiver, third audio information at the second frequency using the amended BLUETOOTH protocol, wherein the third audio information is generated based on the first audio information.

19. The method of claim, 18, wherein the parameter comprises at least one of power and signal quality.

20. The method of claim 17, wherein the first frequency is about 2.4 GHz, and the second frequency is between about 5 MHz and 50 MHz.

* * * * *